United States Patent

[11] 3,587,647

| [72] | Inventor | John D. Walters |
| | | Route 6, Box 244H, New Orleans, La. 70129 |
| [21] | Appl. No. | 870,601 |
| [22] | Filed | Sept. 23, 1969 |
| [45] | Patented | June 28, 1971 |

[54] FOUR WAY VALVE
4 Claims, 6 Drawing Figs.

[52] U.S. Cl. .................................................. 137/625.25, 251/282, 251/176
[51] Int. Cl. ..................................................... F16k 11/02, F16k 5/14
[50] Field of Search............................................ 251/282, 176; 137/625.25, 625.68, 625.48

[56] References Cited

UNITED STATES PATENTS

| 50,746 | 10/1865 | Spengler.......................... | 251/282X |
| 339,979 | 4/1886 | Dobson............................. | 251/282 |
| 348,254 | 8/1886 | Wheeler............................ | 251/282X |
| 375,724 | 1/1888 | Bourke............................. | 137/625.25 |
| 1,849,044 | 3/1932 | Summey........................... | 137/625.65UX |
| 28,718 | 6/1960 | Lewis................................ | 251/176 |
| 661,766 | 11/1900 | Mellin............................... | 137/625.48 |

FOREIGN PATENTS

| 898,565 | 6/1962 | Great Britain.................. | 137/625.68 |

*Primary Examiner*—Henry T. Klinksiek
*Attorney*—Calvin L. Laiche

ABSTRACT: The present invention pertains to a unique four way valve which is inexpensive and ideally suited for use as a solenoid actuated valve due to its ease of operation. The valve basically comprises a porting block contained within a reciprocating transfer block mounted on ball bearings. The transfer block in turn is connected to actuating means which can be a valve handle, solenoid magnet, or the like. Three ports are positioned on one side of the valve, two of which when covered by the porting block are thereby in open communication with each other, and the other port being in open communication with the one port located on the opposite side of the valve body. This relationship is reversed upon shifting the porting block.

PATENTED JUN 28 1971 3,587,647

INVENTOR:
JOHN D. WALTERS

FOUR WAY VALVE

BACKGROUND OF THE INVENTION

The present invention pertains to that field of the art concerned with multiple ported valves, specifically, those having sliding plugs or mechanisms for directing the flow between the various ports.

There are numerous multiple ported valves on the market today which comprise a sliding plug or piston for directing fluid flow between the various ports. These valves are not only characterized as being expensive to manufacture, but additionally, require considerable force to actuate due to internal friction. These and other problems are resolved by way of the present four way valve which will become apparent as the discussion proceeds.

SUMMARY

The present four way valve basically comprises a valve body having four ports therein, three of the ports being in juxtaposition located on one side of the valve body. The other port is positioned on the other side of the valve body and depending upon the position of the valve plug or transfer block, will communicate with either one of a designated pair of the three ports positioned on the opposite side. The transfer block means is slidably mounted within the valve body and is adapted for connection to actuating means, generally two solenoid magnets positioned on opposite sides of the transfer block. The transfer block is mounted on roller or ball bearings within the valve block whereby it can be readily reciprocated or shifted therein. Positioned within the transfer block is a porting block which in a preferred embodiment, is mounted in a slidable relationship with the transfer block along an axis perpendicular to that defined by the reciprocating path of movement of the transfer block. The porting block is provided with a concave or open portion adapted to connect two of the three ports mentioned above in open communication depending upon its lateral position within the valve body. When the porting block covers two of the three ports, then the remaining port is in open communication with the single port on the opposite side of the valve body. Resilient spring means are positioned within the porting block and the transfer block, and between the transfer block and the valve body, so as to maintain the parts in the desired operable relationship.

DESCRIPTION OF THE PREFERRED EMBODIMENT

Figure 2:
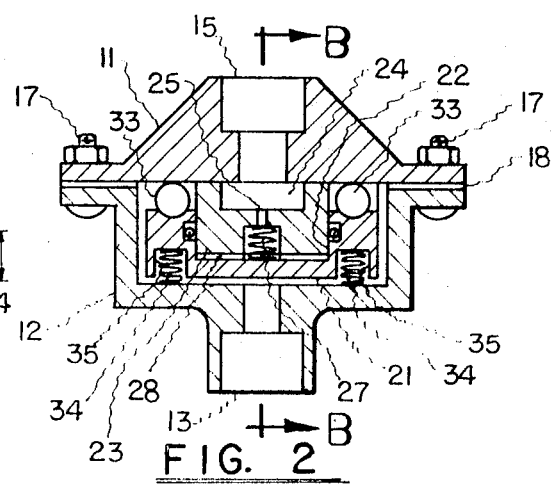
FIG. 2 in the drawing depicts a plan sectional view taken along the line A-A of FIG. 1.

The present four way valve comprises the valve body 10 which in turn further comprises the valve body outlet cover 11 and the valve body inlet cover 12. The inlet cover 12 is provided with the inlet port or opening 13 which is connected to a source of fluid or gas under pressure. The outlet cover 11 is provided with the three ports 14, 15, and 16 which are in juxtaposition, that is side by side or positioned adjacent to each other. Port 15, in a normal piping arrangement utilizing a four way valve, is an exhaust port, whereas, ports 14 and 16 are motor or inlet ports. These ports, that is, 14 and 15 on 15 and 16, are connected one to the other upon actuation of the internal mechanism within the valve as described in detail hereinafter. The valve body members 11 and 12 are bolted together by suitable fastening means, e.g. the nut and bolt assemblies 17 as shown in FIG. 2, the gasket means 18 being provided between these members so as to render them pressuretight.

Figure 3:
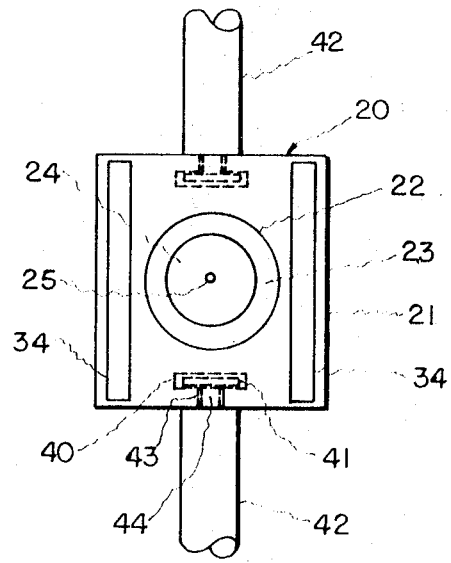
FIG. 3 depicts a plan view of the transfer block with the porting block mounted therein viewing it from the side of the valve wherein the three ports are defined, such being the left-hand side of the embodiment of FIG. 1.

The internal mechanism 20 of the present four way valve comprises the transfer block 21 which is shown in plan view in FIG. 3. The transfer block 21 is provided with the centrally located opening 22 wherein the porting means 23 is slidably positioned in the preferred embodiment of the present invention. As shown in detail in FIG. 1, the porting block 23 is adapted to fit within the transfer block 21 such that it can move laterally of the reciprocating path of movement defined by the transfer block 21, that is, along an axis perpendicular to that defined by the path of movement of the transfer block 21. The porting block 23 is maintained against and moves along the insider surface of the inlet valve cover 11. The porting block 23 is provided with the concave or dished portion 24 which is of a length sufficient to span an adjacent pair of the ports 14, 15, and 16, specifically either 14 and 15 together or 15 and 16 together. Thus, port 15 is always an exhaust port in the normal use of a four way valve.

The porting block 23 is provided with the centrally located aperture 25 which is in open communication with the aperture 26. The resilient spring means 27 is provided within the aperture 26 and functions to urge the porting block 23 toward the inside surface of the valve outlet cover together in cooperation with fluid pressure entering the opening 28 defined between the members 23 and 21 as explained in greater detail hereinafter.

The inner peripheral surface of the transfer block 21 s preferably provided with the groove 30 wherein the resilient O-ring member 31 is mounted. The O-ring 31, preferably rubber, serves to seal the peripheral annulus defined between the members 23 and 21 to thereby prevent leakage from the end spacing 27 through the peripheral annulus into the chamber 32 defined within the valve body 10.

The transfer block 21 is mounted upon the roller or ball bearings 33, at least two of the bearings 33 being provided on each side of the transfer block 21. The bearings 33 fit within the bearing grooves or raceway 34 provided on each side of the transfer block 21, the longitudinal axis of which is parallel to the reciprocating path of movement of transfer block 21. In this manner, the transfer block 21 is readily transported with a minimum of friction. This feature makes the present valve especially attractive for use as a solenoid actuated valve.

Referring to FIG. 2, the springs 35 are provided for urging the transfer block 21 toward the ball bearing assemblies. The transfer block 21 is provided with the grooved portions 36 wherein the springs 35 are positioned.

Figure 1:
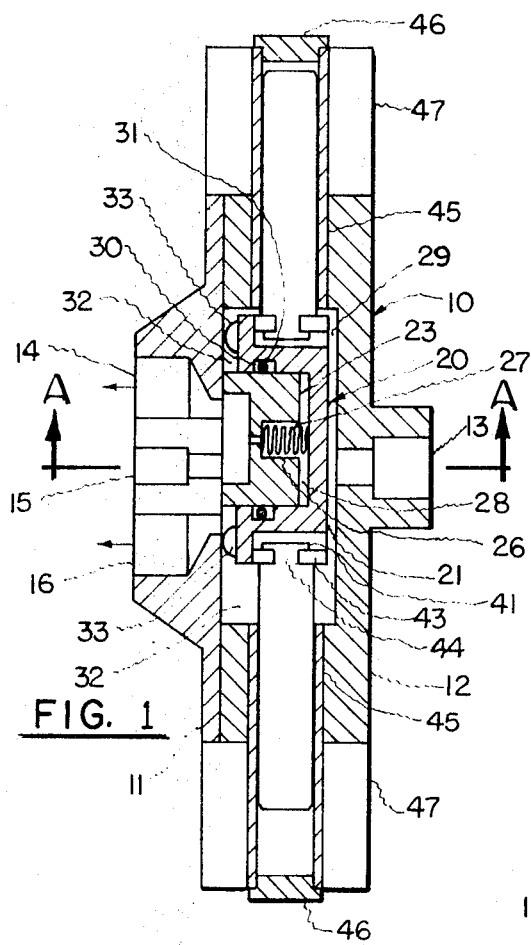
FIG. 1 in the drawing is an elevational sectional view taken along the line B-B of FIG. 2.

The transfer block 21 is also provided with the slotted portions 40 wherein the head 41 of a respective solenoid armature or piston 42 is inserted. The slotted portion 40 is further defined as including the narrowed portion 43 wherein the narrowed portion 44 of a solenoid magnet 42 is inserted as shown in FIGS. 1 and 3. Referring to FIG. 3, the transfer block 21 is shown in a position relative to the solenoid armatures 42 such that it can be disconnected from the armatures upon lifting up for ease of maintenance. Referring to FIG. 1, when the outlet cover 11 is removed, the internal mechanism comprising the transfer block 21 and the porting block 23 can be slid outwards of the valve body without manipulating the solenoid armatures 42 in any manner.

The solenoid armatures 42 are slidably mounted within the chambers 45 which attach to the valve body member 12. The ends of the chambers 45 are sealed by virtue of the caps 46 to prevent leakage. The electric solenoid coils 47 which are mounted around the solenoid magnet chambers 45 are provided for actuating the armatures 42. The solenoid coils 47 are conventional spiral wound wire coils which, when connected to an electrical source, generate a magnetic field which in turn attracts the solenoid armature or piston 42.

In operation, upon actuation of one of the solenoids 47, the respective solenoid armature 42 is magnetically drawn within the solenoid chamber 45 thereby shifting the transfer block 21 in a position such that the chamber 24 defined within the porting block 23 provides for communication between the exhaust or discharge port 15 and either one of the motor or inlet ports 14 and 16, the other motor or inlet port in turn being in open communication with the inlet port 13. For example, in the embodiment depicted in FIG. 1, the exhaust port 15 is in open communication with the motor or inlet port 14, and correspondently, the inlet port 13 is in open communication with the inlet port 16. Fluid entering the port 13 flows into the clearance 29 defined between the transfer block 21 and the valve cover plate 12 and thence, into the chamber 32, past the roller bearing assemblies 33, and out through the outlet port 16. Fluid entering through the port 14 flows into the concave portion 24 of the porting block 23 and out through the port 15, however, a slight portion of the fluid under pressure flows through the aperture 25 into the space 28 and thereby exerts a force between the porting block 23 and the transfer block 21, shoving the porting block 23 into contact with the inside face of the valve outlet cover plate 11.

Figure 4:
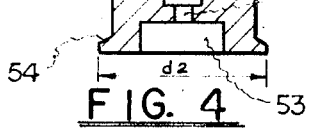
FIG. 4 is an isolated section view of another embodiment of the porting block.

FIG. 4 depicts a preferred embodiment of the porting block 23 shown in FIG. 1, 2, and 3. The block 50 is provided with the apertures 51 and 52 for identical reasons as in the case of block 23. The concave or indented portion 53 also serves a similar purpose. The difference resides in the provision of the extended or skirt portion 54 which provides a greater surface area over which the fluid pressure within the valve is exerted thereby forcing the block 50 into greater intimate contact with the inside surface of the valve outlet plate 11. In other words, pressure is exerted over an area defined by the diameter $d_1$ in the case of the block 23 and in the case of block 50, over the area represented by $d_2$. On the other hand, the force exerted on the transfer block 20 equals $\pi d2/4 \times$ the pressure existing in the cavity 32, which in turn is the force exerted on the ball bearing assembly 33.

Figure 5:
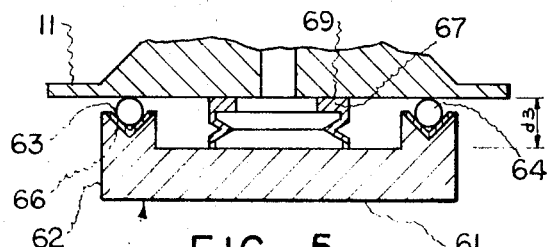
FIG. 5 is an isolated sectional view of another embodiment of the transfer block shown in FIGS. 1 and 2.

FIG. 5 depicts an even more preferred embodiment or design of the transfer block mechanism or assembly 20 as shown in FIG. 3. The block 60 comprises the base portion 61 and the end or side portions 62. These portions are provided with indented or V-shaped grooves 63 which serve as a raceway for the ball bearings 64. A very economical feature of the present valve is the fact that it can be readily fabricated from a plastic material, material, e.g. polyvinyl chloride, including the transfer block 60. In that case, the ball bearing raceways or grooves 65 are preferably lined or coated with a hard material, preferably provided with the V-shaped metal members 66 suitably mounted upon or attached to the portions 62.

The porting block 67 is cast integral with the base portion 61 and is provided with the bellowed portion or structure 68. In casting the height of the porting block 67 is designed to exceed that established or defined by the end of the ball bearings 64, that is, the distance $d_3$ shown in FIG. 5.

By such arrangement, the porting block 67 is under compression when the transfer block 60 is in an operable position within the valve, that is, the surface 69 is in contact with the inside surface of the valve cover 11.

Figure 6:
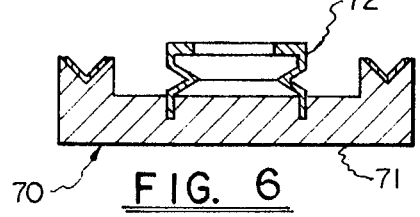
FIG. 6 is also an isolated sectional view of another embodiment of the transfer block shown in FIGS. 1 and 2.

FIG. 6 depicts yet another embodiment of the transfer block 20. In this arrangement, the block 70 comprises the base portion 71 wherein the porting block 72 is cast in place. That is, the bellowed block 72 is made separately and then united to the base portion 71 during the process of casting the block 70.

Various suitable materials of construction will be apparent to one skilled in the art, however, it is preferred to make the porting block 23 of a material which is a low coefficient of friction, e.g. nylon, Teflon oil impregnated bronze, or the like. Similar materials can be employed for the transfer block, however, aluminum bronze or any other material which is easily castable, including steel, would be suitable material of construction. The valve body can be essentially any material. The entire valve could be essentially fabricated from any inexpensive plastic, e.g. polyvinyl chloride, styrene, and the like.

The present valve is preferably employed in air systems to actuate such devices as unloaders on air compressors, air cylinders, control systems, and the like. It is attractive for such uses since it is readily adaptable for use as a solenoid valve which can be very easily actuated with a minimum amount of power. Another distinct advantage is that is relatively inexpensive to manufacture, both with regards to its materials of construction as well as its cost of assembly.

It will be apparent to one skilled in the art that various modifications can be made in the present four way valve without departing from its true scope and spirit. For example, only one of the electric solenoids 47 and its respective armature 42 need be employed with a spring return assembly on the other end. Or, the solenoid assemblies can be eliminated and a hand actuated screw-type stem in combination with a valve bonnet and packing assembly could be employed as in a conventional hand operated valve. Moreover, numerous parts employed in describing the present valve above could be made integral that is, in one piece, without changing the basic concept. Additionally, the configuration of the transfer block 21 and the porting block 23 need not be that as shown and described above. Roller bearing assemblies could also be employed in lieu of the ball bearing assemblies, yet producing the same results.

It can be appreciated that the present valve can also be employed as a one way or two valve. Referring to FIG. 1, the present valve can serve as a one way valve by connecting, e.g. the ports 13 and 16 in a conduit. Shifting the transfer block 21 will cause flow to be interrupted or stopped. As a two way valve, flow via the port 13 can be diverted to either the port 14 or the port 16.

I claim:
1. Four way valve means comprising:
   a. valve body means having four ports therein, three of the ports being in juxtaposition;
   b. transfer block means positioned within said valve body means (a), said transfer block means being adapted for connection to actuating means whereby said transfer block can be reciprocated over the three ports defined within said valve body means (a);
   c. porting block means positioned within said transfer block (a) in a reciprocating relationship along an axis perpendicular to that defined by the reciprocating path of movement of said transfer block (b) whereby said porting block means can be urged outwards into sliding contact with the inside surface of said valve means (a) wherein the three valve ports are defined, said porting block being further defined in that it is concave shaped along its side in contact with the valve body (a) and of a suitable configuration to provide for communication between two of the three ports at any time when said porting block means is in an operating position, said porting block means (c) being defined in that an aperture is provided therein whereby its concave shaped side is in open communication with the opposite side adjacent the transfer block means (b) so that fluid under pressure entering the concave portion of said porting block (c) flows through the aperture and between said porting block (c) and said transfer block (b) which moves said porting (c) away from said transfer block (b) into contact with the inside surface of said valve body (a) thereby sealing off the ports in open communication with the concave portion of the porting block (c) from the interior of the valve body (a);
   d. ball bearing means comprising a plurality of ball bearings operably positioned in a parallel spaced apart relationship on each side of said transfer block means (b) and positioned between said transfer block (b) and the inside of said valve body means (a) along axes defined by the path of movement of said transfer block (b), whereby said transfer block means (b) is readily reciprocated within said valve body means (a); and
   e. resilient means positioned between said transfer block means (b) and said valve body means (a) on the side opposite that of said ball bearing means (d) for urging said transfer block means (a) toward said ball bearing means (d).

2. The four way valve means of claim 1 further characterized as comprising:
f. sealing means positioned within the peripheral annulus defined between said transfer block (b) and said porting block (c) to prevent flow of fluid between said members; and
g. resilient spring means positioned between said transfer block (b) and said porting block (c) such that said porting block (c) is constantly urged toward the inside surface of said valve body (a) wherein the three valve ports are defined.

3. The four way valve means of claim 2 being further defined in that said porting block (c) is provided with an extended bellowed portion which is connected to said transfer block means (b) whereby upon inserting said transfer block (b) in the valve body means (a) the bellowed portion is compressed which in turn urges the sliding surface of said porting block (c) into contact with the inside surface of said valve body (a).

4. The four way valve means of claim 3 being defined in that said transfer block means (b) is provided with ball bearing inserts which in combination with the inside surface of said valve body (a) provides a confining raceway for said ball bearing means (d).